Sept. 19, 1939.    H. H. LEININGER    2,173,367
HEATER
Filed Feb. 23, 1938    2 Sheets-Sheet 1

INVENTOR
HENRY H. LEININGER
BY John W. Michael
ATTORNEY

Sept. 19, 1939. H. H. LEININGER 2,173,367
HEATER
Filed Feb. 23, 1938 2 Sheets-Sheet 2
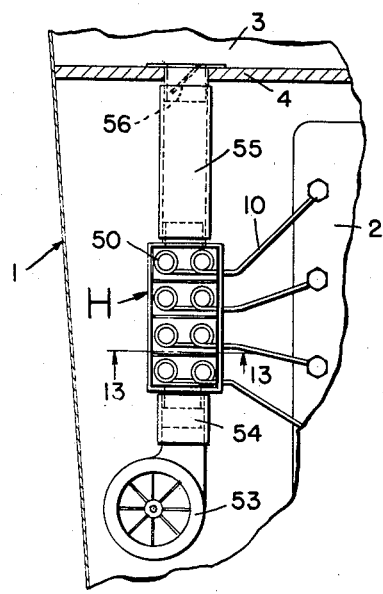
FIG. 12.
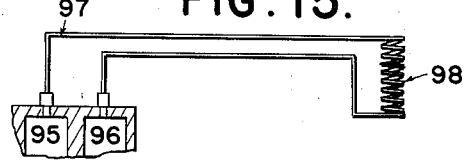
FIG. 15.
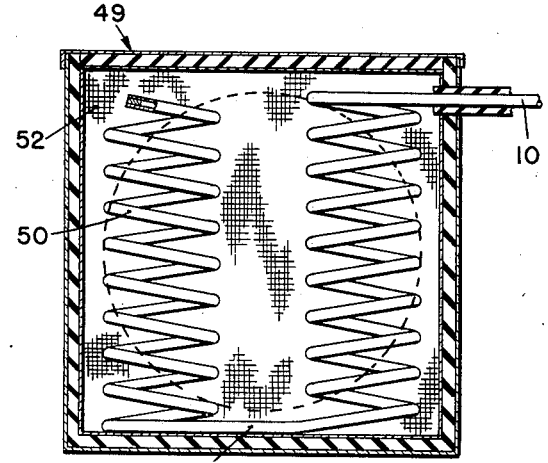
FIG. 13.
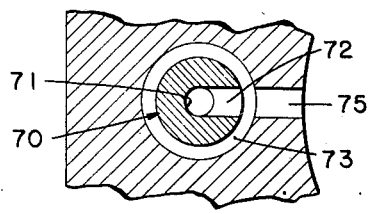
FIG. 8.
FIG. 7.
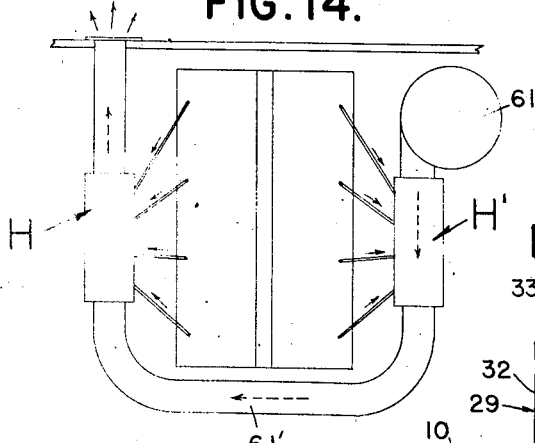
FIG. 14.
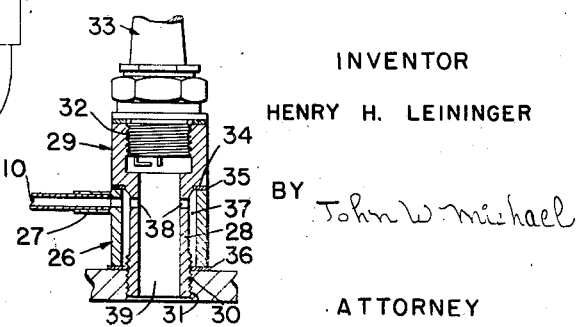
FIG. 6.
INVENTOR
HENRY H. LEININGER
BY John W. Michael
ATTORNEY Patented Sept. 19, 1939

2,173,367

UNITED STATES PATENT OFFICE 2,173,367

HEATER

Henry H. Leininger, Milwaukee, Wis.

Application February 23, 1938, Serial No. 191,942

19 Claims. (Cl. 237—12.3)

This invention relates to an improvement in heaters for use with internal combustion engines and is particularly designed and adapted for use with automotive vehicles.

One of the objects of the invention is to provide a heater of this character which is of extremely simple and durable construction, reliable and highly efficient in operation and easily and economically manufactured and installed.

The present invention proposes to utilize the heat generated in the combustion spaces or cylinders of the engine as an incident to the explosion or power stroke of the engine as a source of heat and to do this in such a novel and effective way as to bring about the rapid and effective heating of the air circulated in the passenger compartment of the vehicle. Usually the heater comprises a plurality of elongated tubes or equivalent structures of metal or other material having a high degree of thermal conductivity and possessed of the strength and other requisite properties. The tubes are in open communication with the combustion spaces of the engine but are otherwise closed. On the explosion stroke of the engine the gases of combustion fill the tubes and highly heat the same, and this heating effect is utilized to heat the passenger compartment of the car by advancing over the heater surface of the tubes a heat circulating medium. A fan or blower and suitable conduits may be employed to advance the air over the tubes and conduct it into the compartment to be heated. In conjunction with the tubes a metallic structure similar to a hot plate may be employed, if desired.

The invention also proposes several novel ways of interconnecting the tubes or their equivalents with the combustion chamber of the engine.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 6 is a view similar to Figure 4 and illustrating a modified form of a type of connection shown in Figure 4;

Figure 7 is a view partly in transverse vertical section and partly in side elevation showing still another type of connecting structure between the heating tubes and the combustion chamber of the engine;

Figure 8 is a view in horizontal section taken on line 8—8 of Figure 7;

Figure 12 is a fragmentary view partly in top plan and partly in horizontal section showing a modified form of construction of the heater;

Figure 13 is a view in transverse vertical section taken on line 13—13 of Figure 12;

Figure 14 is a diagrammatic view in top plan illustrating a modification of the type of heater shown in Figures 12 and 13; and Figure 15 is a diagrammatic view showing another way of interrelating the heating tubes and their coils or equivalent structure with the combustion chambers of the engine.

Figure 1:
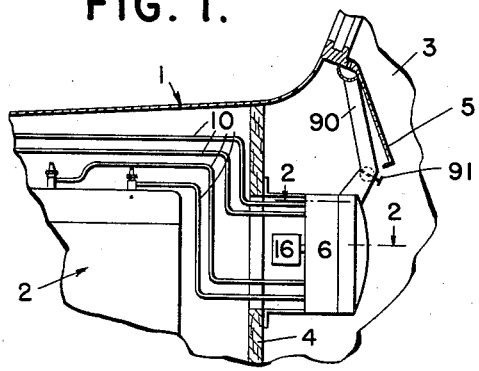
Figure 1 is a fragmentary view in side elevation showing a heater constructed in accordance with the present invention and installed on a passenger automobile, parts being shown in section for the sake of illustration.

Referring to the drawings and more particularly to Figures 1 to 4 inclusive, the numeral 1 designates generally an automobile which may be any type of passenger car or other automotive vehicle and which is provided with a suitable power plant usually in the form of an internal combustion engine 2. A portion of the structure which forms the passenger compartment of the vehicle is designated at 3 and this is separated from the compartment containing the engine by means of a partition 4. The usual instrument board is designated at 5.

The heater embodying the present invention is designated generally at 6 and comprises a suitable casing 7 having an openwork or grille front 8. Brackets 9 are provided to support the casing on the partition 4. The heating elements of the heater are constituted of elongated tubes 10 of steel, copper or other suitable metal or material having high thermal conductivity, impervious to the passage of gases and able to withstand high temperatures. At one end each tube is provided with a coupling 11 adapting it for direct and free connection with a combustion chamber 12 of the engine. The connection provided between each tube 10 and its combustion chamber 12 may take various forms, which will be hereinafter fully described.

Figure 3:
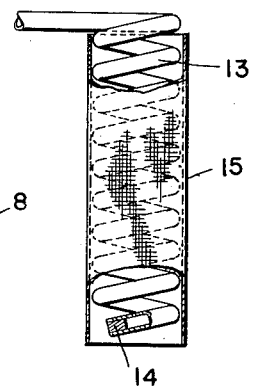
Figure 3 is a view in vertical section taken on line 3—3 of Figure 2.
Figure 11:
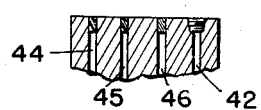
Figure 11 is a fragmentary view in vertical cross section taken on line 11—11 of Figure 9.

The end portion of each tube 10 opposite or remote from its connection with the engine is coiled as designated at 13 and the extremity of each coiled portion 13 is closed or sealed by means of a plug or in any other suitable way as shown to advantage at 14 in Figure 3. The coils 13 are vertically disposed in the casing and preferably are arranged closely adjacent and parallel to each other. They may be and preferably are surrounded by a wire mesh or screen shield 15. An electric motor 16 is suitably supported on the casing 7 and has a fan 17 fastened to its armature shaft.

When the motor 16 is running the fan draws air in through the opening 18 at one end of the heater casing, advances it over the coils 13 and causes it to discharge through the openwork or grille front 8 of the casing and then circulate through the passenger compartment of the automobile. When the engine is running the combustion occurring in the combustion chambers or cylinders of the engine is communicated directly to the interior of the tubes 10 so that these tubes become highly heated. Consequently when the air is advanced over the coils of the tubes it is heated. The action is rapid and effective. In some instances it may be desirable to provide one such tube 10 and coil 13 for each cylinder of the automobile, although usually a lesser number is sufficient to obtain satisfactory results.

Figure 4:
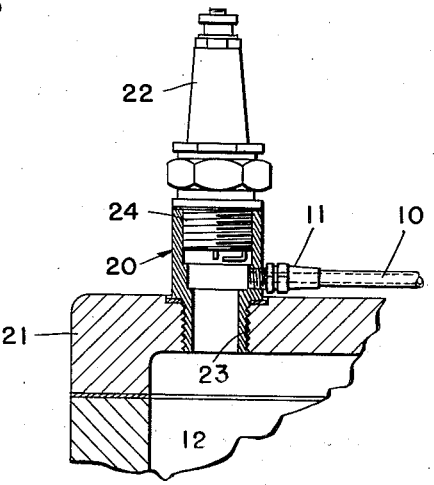
Figure 4 is a fragmentary view partly in vertical cross section and partly in side elevation showing one type of connection which may be employed between each tube and the combustion chamber of the engine.

As illustrated in Figure 4, the fitting 11 is threaded to an adapter 20 employed between the head 21 of the engine block and a spark plug 22. The adapter is tubular in form and open ended. One end is threadedly connected as at 23 with the engine block and the other end is threadedly connected as at 24 to the spark plug.

Figure 5:
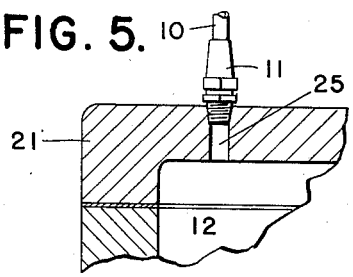
Figure 5 is a similar view showing a different type of connection.
Figure 10:
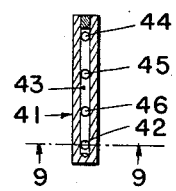
Figure 10 is a view in horizontal cross section taken on line 10—10 of Figure 9.

In the form of the invention shown in Figure 5 the fitting or coupling 11 is directly threaded to the outer end of a passage 25 leading through the head of the engine and communicating freely with the underlying combustion chamber 12 thereof.

As shown in Figure 6 each fitting or coupling 11 may be omitted and replaced by a short sleeve 26 provided with a laterally extending nipple 27 with which each tube 10 is coupled. This sleeve 26 is rotatably mounted on the reduced portion 28 of an adapter designated generally at 29. The adapter 29 is threadedly connected as at 30 with an opening 31 in the engine head so that the interior of the adapter communicates freely with the combustion chamber. The outer end of the adapter is enlarged as shown and is threadedly connected as at 32 with the spark plug 33. The structure of the adapter is such as to provide a shoulder 34. A gasket 35 is interposed between the shoulder 34 and the upper end of the sleeve 26. A similar gasket 36 is interposed between the lower end of the sleeve 26 and the engine head. An annular space designated at 37 is defined between the outer periphery of the reduced portion 28 of the adapter and the inner periphery of the sleeve 26. The tube 10 communicates directly with this space. Transverse passages or ports 38 in the reduced portion 28 of the adapter provide for communication between the space 37 and the axial opening 39 in the reduced portion 28 of the adapter. This construction provides for an hermetic seal and enables the adapter to be tightened up without disturbing the angular position of the tube 10 or its connecting sleeve 26.

As illustrated in Figure 7, the connection of each tube 10 with its combustion space of the engine may be effected by providing a specially constructed bolt in lieu of the ordinary stud bolt conventionally employed for fastening the head to the engine block. The bolt is designated generally at 70 and has a longitudinal passage 71 tapped at its outer end to adapt it for connection with a coupling member 11. The longitudinal passage communicates by means of a transverse passage 72 with an annular groove 73 provided in the shank of the bolt above its threaded portion and the annular groove in turn communicates with the passage 75 provided in the cylinder head and opening directly into the adjacent combustion chamber.

Figure 9:
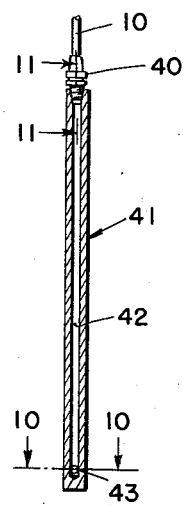
Figure 9 is a view in vertical cross section taken on line 9—9 of Figure 10 and showing the invention embodied in the hot plate type of structure.
Figure 2:
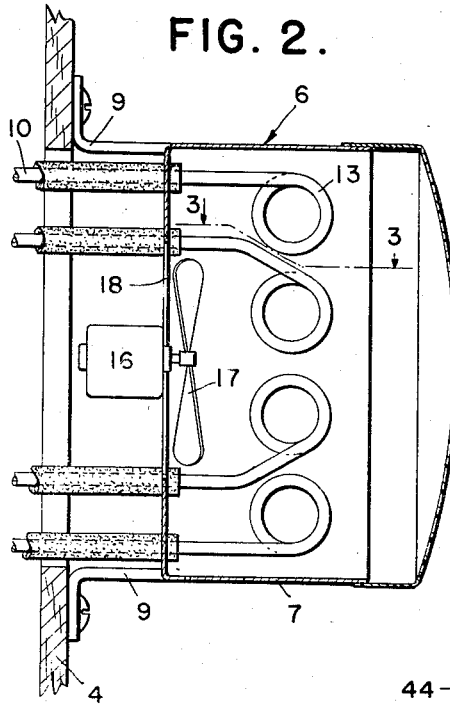
Figure 2 is a view in horizontal cross section taken on line 2—2 of Figure 1.

In the form of the invention shown in Figure 9 the tubes 10 are connected up with the combustion chambers of the engine as before but they are somewhat shorter in that their coils are omitted and they are directly connected by a coupling 40 to a hot plate 41. A coupling 40 threads into one end of a longitudinally extending passage 42 in the plate 41. This passage 42 communicates at its lower end with a transverse passage 43 which in turn communicates with vertical passages 44, 45 and 46 provided in the hot plate and extending in spaced parallel relation to the passage 42. These passages 44, 45 and 46 are closed at both ends. They may be drilled into the hot plate from one end to a point adjacent but spaced from the other end. Then the open end of the passages are plugged or closed.

In the form of the invention shown in Figures 12 and 13 the heater comprises the metallic tubes equipped with coils as before but the heating elements are placed in a different position and are somewhat differently housed or encased and the structure for advancing a heat circulating medium over the coils for controlling its circulation in the passenger compartment of the vehicle is varied. As illustrated in Figures 12 and 13, the coils corresponding to the coils 13 and designated at 50 are provided in pairs at the end of each tube 10 and interconnected by an integral length of tubing 51 at their lower ends. The pairs of coils are supported in spaced parallel relation in a rectangular casing 49 and are separated from each other by screening or wire mesh 52. The casing 49 is located in the engine compartment and is suitably supported. The coils and their casing and associated structure constitute a heating unit H. An electrically driven fan or blower designated at 53 is connected as at 54 to one end of the casing whereas a conduit 55 leads from the other end of the casing through the partition 4 of the passenger compartment 3 of the vehicle. A valve 56 may be provided in the conduit 55. With this arrangement the blower is continuously forcing fresh air over the coils and circulating it through the passenger compartment of the vehicle.

The structure shown in Figure 12 is adapted for use with a heater where only four of the combustion chambers of the engine are utilized. Where the combustion engine is of the V-8 type it may be desirable and is entirely feasible to have eight heating elements, one for each of the eight cylinders of the engine. With such a construction two similar heating units H and H' are provided, one on each side of the engine block. A blower designated at 61 forces air through the heating unit H', then through a connecting conduit 61' and through the heating unit H. In other respects the construction and operation is the same.

It will be understood that the valve 56 is manually operable so that it may be opened or closed or disposed in an intermediate position.

The heating unit may also be used as a defroster. For example, as shown in Figure 1, a conduit 90 may lead from the casing 7 up to a point adjacent the lower end of the windshield to cause streams of hot air to flow up along the inside of the windshield and keep it free of frost. The conduit 90 may be provided with a butterfly valve 91 so that it may be rendered operative or inoperative as desired.

The present invention also contemplates the utilization of a plurality of combustion chambers for heating a heating tube and its coil or equivalent. For example, as shown in Figure 15, the combustion chambers 95 and 96 of an internal combustion engine may be coupled to the open ends of a heating tube 97, an intermediate portion of which is provided with a heating coil 98 which may be enclosed and associated with air advancing means as in the other embodiments of the invention.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. The combination with an internal combustion engine having a combustion chamber of a heater comprising an elongated metal tube having one end connected to the engine and communicating with the interior thereof, the tube being otherwise completely closed, said tube being heated under the influence of combustion therein, and means for advancing air over the tube and through the space to be heated.

2. A heater for automotive vehicles having an internal combustion engine provided with a combustion chamber and comprising an elongated metal tube having one end connected to the engine and communicating with the combustion chamber thereof, the metal tube being otherwise completely closed to define an enclosed heating space, the tube becoming highly heated when the engine is operated, said tube having its outer end portion coiled, and means for advancing air over the coil portion of the tube and circulating it through the compartment of the vehicle to be heated.

3. A heater for automotive vehicles having a multi-cylinder internal combustion engine and a head for said cylinders co-acting therewith to define combustion chambers, a plurality of elongated metal tubes, one for each cylinder, each metal tube having one end connected to the cylinder head and communicating with the combustion chamber of said cylinder, each tube being otherwise completely closed and having its outer end portion coiled, an enclosure for the coils of the tubes, a conduit leading from the enclosure to the space to be heated, and a blower for forcing air through the enclosure, over said tubes and through the conduit into the space to be heated.

4. The combination with an internal combustion engine having a combustion chamber, of a heater comprising a hollow metal body, means establishing communication between the interior of the hollow metal body and the combustion chamber, said hollow metal body being otherwise closed, and becoming highly heated under the influence of combustion occurring therein and in the chamber, and means for advancing air over the hollow metal body and circulating it through the compartment to be heated.

5. The combination with an internal combustion engine having a combustion chamber, of a heater comprising a metal tube having one end connected to the engine and in open communication with the combustion chamber, said tube having its outer end closed and being entirely imperforate except for the end in communication with the combustion chamber, said tube becoming heated under the influence of the combustion occurring in said chamber and in the tube.

6. The combination with an internal combustion engine having a combustion chamber of a hollow metal body entirely closed and imperforate except for a single opening, means for establishing communication between the combustion chamber and the interior of said body through said opening, said hollow metal body becoming heated under the influence of combustion occurring in said chamber and in said hollow body and means for advancing a heat circulating medium over said hollow body.

7. The combination with an internal combustion engine having a combustion chamber of a heater comprising an elongated metal tube, said tube being completely closed and imperforate except for a single opening at one end thereof, and means for connecting the open end of the tube to the engine and in free and open communication with the combustion chamber thereof.

8. The combination with an internal combustion engine having a combustion chamber of a heater comprising an elongated metal tube, said tube being completely closed and imperforate except for a single opening at one end thereof, and means for connecting the open end of the tube to the engine and in free and open communication with the combustion chamber thereof and comprising an opening in the cylinder head and a coupling between the open end of the tube and the opening in the cylinder head.

9. The combination with an internal combustion engine having a combustion chamber of a heater comprising an elongated metal tube, said tube being completely closed and imperforate except for a single opening at one end thereof, and means for connecting the open end of the tube to the engine and in free and open communication with the combustion chamber thereof and comprising an adapter between the combustion space of the engine and a spark plug therefor and a coupling between the open end of the tube and the adapter.

10. The combination with an internal combustion engine having a combustion chamber of a heater comprising an elongated metal tube, said tube being completely closed and imperforate except for a single opening at one end thereof, and means for connecting the open end of the tube to the engine and in free and open communication with the combustion chamber thereof and comprising an adapter between the combustion space of the engine and a spark plug therefor, and a coupling between the open end of the tube and the adapter, said coupling including a sleeve rotatably interfitted with the adapter, and means for effecting a seal between the sleeve, the adapter and the engine.

11. The combination with an internal combustion engine having a combustion chamber of a heater comprising an elongated metal tube, said tube being completely closed and imperforate except for a single opening at one end thereof, and means for connecting the open end of the tube to the engine and in free and open communication with the combustion chamber thereof, and comprising a bolt interconnected with the engine and having ports and passages communicating with the interior thereof and a coupling between the open end of the tube and one of the passages of the bolt.

12. A heater for automotive vehicles having a multi-cylinder internal combustion engine and a head for said cylinders co-acting therewith to define combustion chambers, a plurality of elongated metal tubes, one for each cylinder, each metal tube having one end connected to the cylinder head and communicating with the combustion chamber of said cylinder, each tube being otherwise completely closed and having its outer end portion coiled, an enclosure for the coils of the tubes, a conduit leading from the enclosure to the space to be heated, and a blower for forcing air through the enclosure, over said tubes and through the conduit into the space to be heated, and screening for separating said coils.

13. A heater for automotive vehicles having a multi-cylinder internal combustion engine, a plurality of elongated metal tubes, one for each of said cylinders, each metal tube having one end connected to and in free communication with a cylinder of the engine, each of such tubes being otherwise completely closed and having its outer end portion coiled, said coils being disposed in spaced parallel relation, a casing for the coils having openings at its ends, and means for advancing air through the casing and over the coils and into the compartment of the vehicle to be heated.

14. A heater for automotive vehicles having a plurality of cylinders and comprising a plurality of heating units each of which is made up of a plurality of elongated metal tubes connected to the combustion chambers of the engine and extended therefrom and coiled at their outer extremities, said tubes being completely closed except for their communication with the combustion chambers, a casing for the coils of each heating unit, a conduit connecting the casing, a conduit connecting one of the casings with the compartment to be heated, and a blower associated with the other casing for advancing air over the coils in both casings and circulating it through the compartment to be heated.

15. A heater for automotive vehicles having a multi-cylinder internal combustion engine and a head for said cylinders co-acting therewith to define combustion chambers and comprising a plurality of metal tubes, each tube having one end connected and communicating with the combustion chamber of one cylinder, the opposite end of said tube connected to the combustion chamber of another cylinder, the tube becoming heated under the influence of the combustion occurring in the combustion chambers.

16. A heater for automotive vehicles having a multi-cylinder internal combustion engine and a head for said cylinders co-acting therewith to define combustion chambers and comprising a plurality of metal tubes connected at their ends to the combustion chambers, and heat dissipating means co-acting with intermediate portions of the tubes.

17. The combination with an internal combustion engine having combustion chambers of a heater comprising a hollow metal body, means establishing communication between the interior of the hollow metal body and the combustion chambers, said hollow metal body and said means being hermetically sealed except for their internal communication with the combustion chambers and becoming highly heated under the influence of combustion therein, and means for advancing air over the hollow metal body and circulating it through the compartment to be heated.

18. The combination with an internal combustion engine having a combustion chamber of a heater including an elongated metal tube having one end connected to the engine and communicating with the interior thereof, a metal coil connected to and communicating with the other end of the tube, said tube and coil being completely closed except for their communication with the combustion chamber, and means for advancing air over the coil and through the space to be heated.

19. The combination with an internal combustion engine having a combustion chamber, of a heater comprising a hollow metal body, means establishing communication between the interior of the hollow metal body and the combustion chamber, said hollow metal body and said means being hermetically sealed except for their internal communication with the combustion chamber and being highly heated under the influence of combustion therein, and means for advancing air over the hollow metal body and circulating it through the compartment to be heated.

HENRY H. LEININGER.